Patented Apr. 12, 1949

2,467,352

UNITED STATES PATENT OFFICE 2,467,352

VINYL HALIDE POLYMER COMPOSITIONS

Thurman V. Williams, Jr., Niagara Falls, N. Y., assignor to E. I. du Pont de Nemours & Company, Wilmington, Del., a corporation of Delaware No Drawing. Application April 22, 1944, Serial No. 532,366

18 Claims. (Cl. 260—29.6)

This invention relates to emulsified compositions containing vinyl halide polymers and copolymers and applications of such compositions to form coatings, films, sheets, and other useful articles.

Most commercial grades of polyvinyl halides and copolymers of vinyl halides with other polymerizable compounds have little or no solubility in most organic solvents at room temperature. This presents difficulties in formulating compositions of this type of vinyl resin for a variety of industrial purposes, including coating fabrics, paper, wood, metal, and other surfaces and making films, sheets, and other articles.

To avoid the expense of unusual solvents, one expedient is to make a paste of the vinyl halide resin with a liquid plasticizer. The consistency of such paste is limited, as the proportion of the plasticizer must be adjusted in respect to the plasticizing effect desired. Hence, there has been need for a method of formulating vinyl halide resin compositions of any desired consistency, from relatively thin liquids to heavy pastes, in which the amount of plasticizer, pigment, or other desired ingredients can be varied as desired.

The vinyl halide polymers and copolymers are commonly made by polymerizing aqueous emulsions of the monomers, coagulating the dispersion of polymer, separating the water and drying to obtain the powdered or granular resin. It has been desired to make the pastes directly from the aqueous dispersions resulting from emulsion polymerization, but heretofore there has been no satisfactory method for so doing.

An object of my invention is to prepare vinyl halide resin compositions having consistencies varying from relatively thin liquids to heavy pastes, in which the consistency may be independent of the amounts of other ingredients such as plasticizers, pigments, fillers, and the like.

A further object is to prepare improved vinyl resin coating compositions.

Another object is to prepare an improved composition of a polymerized vinyl halide or copolymer of a vinyl halide with another polymerizable substance which is a water-in-oil type emulsion.

Other objects will be apparent from the following description of my invention.

In practicing my invention I start with an aqueous emulsion of the polyvinyl chloride, which preferably is formed by polymerizing an aqueous emulsion of vinyl chloride monomer. I mix with this a liquid which is a swelling agent for the polyvinyl chloride and rapidly agitate the mixture until a homogeneous liquid is obtained having a water dispersed phase, i. e., a water-in-oil type of emulsion.

In one method of practicing my invention I make an aqueous emulsion of one or more vinyl halide monomers, which emulsion may or may not contain one or more other polymerizable substances, and subject this to polymerizing conditions so as to obtain an aqueous emulsion of the polymer or copolymer. Preferably, a suitable dispersing agent is included in the emulsion prior to the polymerization so as to produce at least a relatively stable dispersion of the polymer. I then select a swelling agent, for example, benzene, toluene or chlorobenzene, which will not dissolve the polymer to any substantial extent but which will cause it to swell at low temperatures, and mix the swelling agent with the emulsion polymer by means of rapid agitation until the mass obtains a creamy consistency. I have found that during the mixing operation the mass changes from an aqueous dispersion to a dispersion wherein the water is dispersed in the liquid swelling agent. The consistency of the resulting water-in-oil type emulsion will depend upon the amount of water in the polymer dispersion and the amount of liquid swelling agent utilized. The consistency may thus be varied over a wide range from a thin cream to a heavy paste. If desired, the composition may be thinned by stirring in more of the swelling agent.

The following examples illustrate specific modes of practicing my invention:

Example 1

A water-in-oil type of emulsion was made of the following ingredients (in parts by weight):

| | Parts |
|---|---|
| Aqueous dispersion of vinyl chloride copolymer, 18% | 200 |
| Chlorobenzene | 100 |
| Dibutyl phthalate | 50 |
| Chromium oxide | 2 |
| Titanium dioxide | 50 |

The copolymer aqueous dispersion was made by copolymerizing an aqueous emulsion of 95 parts of vinyl chloride with 5 parts of diethyl fumarate and contained 18% by weight of the solid copolymer.

The chlorobenzene, the dibutyl phthalate, and the pigments were mixed together. Then the copolymer aqueous dispersion was added with rapid stirring. After 5 minutes of stirring, a water-in-oil emulsion was formed, the chlorobenzene forming the continuous phase. The emulsion had the heavy, creamy consistency of mayonnaise.

The emulsion was readily coated on cotton cloth and after press-polishing at a temperature of 160° C. for two minutes, produced a smooth, adherent coating having good flexibility and little tackiness.

*Example 2*

Using a 27% solids content aqueous dispersion of the copolymer of Example 1, a water-in-oil emulsion was made of the following:

| | Parts |
|---|---|
| Copolymer aqueous dispersion | 200 |
| Chlorobenzene | 200 |
| Pigment—dibutyl phthalate mixture | 73.8 |
| Additional dibutyl phthalate | 12.6 |

The pigment-mixture was made by grinding 65 parts by weight of the pigment with 35 parts of the phthalate. The aqueous copolymer dispersion was stirred into a mixture of the other ingredients, as in Example 1.

Cloth was coated with the resulting emulsion and heated at 150° C. for 15 minutes. This produced an attractive, smooth coating having good adherence.

Good results also were produced by heating the coated fabric at 125° C. for 15 minutes.

*Example 3*

The method of Example 2 was carried out, using a 32% solids aqueous dispersion of the copolymer of Example 1 with the following:

| | Parts |
|---|---|
| Copolymer aqueous dispersion | 200 |
| Trichlorethylene | 100 |
| Pigment—dibutoxyethyl phthalate mixture | 78.2 |
| Additional dibutoxyethyl phthalate | 13.4 |

Cloth was coated with the resulting emulsion and heat treated, as in Example 2, with similar results.

*Example 4*

The method of Example 2 was carried out, using the copolymer aqueous dispersion of Example 3 with the following:

| | Parts |
|---|---|
| Copolymer aqueous dispersion | 200 |
| Toluene | 100 |
| Pigment—dibutoxyethyl phthalate mixture | 78.2 |
| Additional dibutoxyethyl phthalate | 12.62 |

Cloth coated with this emulsion and heat treated as in Example 2 was of comparable quality.

*Example 5*

The method of Example 2 was carried out, using the copolymer aqueous dispersion of Example 3, with the following:

| | Parts |
|---|---|
| Copolymer aqueous dispersion | 200 |
| Xylene | 100 |
| Pigment—dibutoxyethyl phthalate mixture | 78.2 |
| Additional dibutoxyethyl phthalate | 12.6 |

This emulsion produced good, adherent coatings when coated on cloth and heat treated as in Example 2. In one instance, a cotton fabric was given four successive coats, each 0.005 inch thick when applied, and heat treated after each coating operation at 95 to 110° C. for five minutes. This produced a uniform coating of excellent quality.

*Example 6*

An emulsion of the following formulation was made, using an aqueous dispersion of a copolymer of vinyl chloride (95%) and dimethyl fumarate (5%), the aqueous dispersion having a solids content of 32% by weight:

| | Parts |
|---|---|
| Copolymer aqueous dispersion | 200 |
| Xylene | 100 |
| Dibutoxyethyl phthalate | 30 |

The aqueous dispersion was slowly added to a mixture of the other two ingredients, with rapid agitation. This formed a thick paste-like emulsion having xylene in the continuous phase and water in the dispersed phase. A thin layer, spread on black iron sheet and baked at 160° C. for three minutes formed a durable, adherent coating.

*Example 7*

An aqueous emulsion of vinyl chloride was polymerized to produce an aqueous dispersion containing 16% by weight of polyvinyl chloride. This was used as in the preceding examples to make a water-in-oil emulsion, according to the following formulation:

| | Parts |
|---|---|
| Polyvinyl chloride aqueous dispersion | 200 |
| Chlorobenzene | 100 |
| Pigment—dibutoxyethyl phthalate mixture | 45 |
| Additional dibutoxyethyl phthalate | 5 |

The pigment-plasticizer mixture was made as in the preceding examples and contained 65% by weight of pigment.

The plasticizer designated in the Examples 3, 4, 5, 6 and 7 is dibutoxyethyl phthalate, having the formula:

$$C_6H_4(COO-CH_2-CH_2-O-C_4H_9)_2$$

In accordance with my invention, the aqueous dispersion of the vinyl halide resin may contain from 15 to 55% by weight of the polymer. I generally prefer to use dispersions containing from 30 to about 50% of the polymer. While I prefer to use aqueous dispersions prepared by emulsion polymerization, the invention is not so restricted. Relatively stable dispersions made by other known methods may also be used.

The aqueous dispersion of the vinyl halide resin preferably will contain sufficient of a suitable dispersing agent to produce a relatively stable emulsion. The various known dispersing agents may be used and my invention is not restricted to any particular kind of dispersing agent. Examples of suitable dispersing agents are the sulfonated higher hydrocarbons, sulfonated oils, high molecular weight sulfuric acid esters, and the like.

In mixing the resin dispersion with the swelling agent, I prefer to use an amount of swelling agent equal to at least 50% by weight of the aqueous emulsion, although in some cases as low as 25% may be used. The amount of swelling agent may be as much higher than 50% as desired, in order to obtain the desired consistency. By using a sufficiently large amount of the swelling agent, very thin liquid compositions may be made. Generally I prefer to use not more than the amount required to produce a thin, cream-like, liquid composition, which generally requires 100 to 200% of the swelling agent.

The liquid swelling agents suitable for practicing my invention are volatile liquids which are not miscible with water and which will cause the vinyl halide resin utilized to swell, without dissolving it, when brought in contact therewith at temperatures below 50° C. Thus, the selection of the swelling agent will depend upon the nature of the specific vinyl halide resin utilized. In any case, the suitability of a liquid as swelling agent for my invention can be determined by a simple test, namely, by placing it in contact with the vinyl halide resin to be used and subjecting it to a temperature below 50° C., e. g. 15–30° C. for 24 hours and then noting whether there has been appreciable swelling or solution of the resin. Liquids which definitely swell the resin without substantial solution thereof under such conditions are suitable for use in practicing my process. Examples of such liquid swelling agents which may be used with most grades of polyvinyl chloride and various copolymers thereof are aromatic hydrocarbons, such as benzene, toluene, and xylene; chlorinated aromatic hydrocarbons, such as chlorobenzene, chlorotoluene, and chloroxylene; hydrogenated aromatic hydrocarbons, such as tetralin, decalin, cyclohexane, and cyclohexene; and chlorinated aliphatic hydrocarbons, such as trichlorethylene, ethylene dichloride, carbon tetrachloride, perchlorethylene, and butyl chloride.

I generally prefer to add one or more plasticizers. Also, if desired, suitable pigments, fillers, and coloring matter, and the like may be added, and generally I prefer to add a pigment. The kind and amount of such plasticizers, pigments, fillers, coloring matters, etc., to be added will depend upon the desired degree of plasticization and color effect desired, and such will be apparent to those skilled in preparing resin compositions. Examples of plasticizers which I have found suitable include esters, such as phthalates, sebacates, adipates, oleates, ricinoleates, fumarates, and organic phosphates. I also may add stabilizing materials as may be required, for example, phenoxypropylene oxide or lead silicate.

The vinyl halide resins which may be used in practicing my invention are the polymers of the vinyl halides and their copolymers with other polymerizable substances, which copolymers have a vinyl halide content of more than 50% by weight. The invention is most useful in respect to the more insoluble grades of such polymers and copolymers, in which the vinyl halide content is 75% or more by weight. A preferred type of vinyl halide resin is the copolymer of vinyl chloride with a dialkyl fumarate. Other examples are the copolymers of vinyl chloride or other vinyl halide with compounds having the group: $CH_2=C<$, such as vinyl esters, vinyl ethers, vinyl ketones, acrylic acid, alkacrylic acids, haloacrylic acids; esters and nitriles of such acrylic acids; ethylenic acids, such as maleic, fumaric, and itaconic acids and their esters; and vinylidene chloride and other vinylidene halides. Vinyl halide copolymers of other unsaturated compounds also may be used, e. g., copolymers with olefins and halogenated olefins, such as ethylene and trichlorethylene; and dienes and halodienes, such as butadiene, isoprene, and chloroprene.

My compositions are suitable for the manufacture of self-sustaining films, sheets, or molded articles, or as coating compositions for various base materials, such as paper, cloth, resin films, metal, wood, and the like. As coating compositions they may be applied by spreading, brushing, roller-coating, dipping, spraying, or other methods known to the art.

After applying my compositions as coatings, or on a casting surface in order to make a self-sustaining film, or as moldings, it is necessary to subject the composition to a heat treatment which causes gelatinization of the vinyl resin and removal of the volatile swelling agent. To obtain this result I have found that usually it is necessary to heat the material to a temperature of at least about 90° C.; generally I prefer to heat it to a temperature of 100° to 160° C. Even higher temperatures can be utilized, if desired, e. g., up to around 200° C. The time of heating may vary, but generally a heat treatment of 2 to 5 minutes is sufficient. I prefer to heat treat for a time sufficient to cause substantially complete volatilization of the volatile liquid swelling agent. If desired, the vapors of the swelling agent may be recovered by condensation for reuse.

I claim:

1. The process which comprises mixing an aqueous dispersion of a solid copolymer of one vinyl halide with another polymerizable acyclic compound having one ethylenic bond, composed preponderantly of vinyl halide, with a substantially water-immiscible, volatile, organic liquid in which said copolymer is substantially insoluble but which is capable of swelling said copolymer when contacted therewith at temperatures below 50° C., and subjecting the mixture to rapid agitation until a water-in-oil type of emulsion is obtained, said aqueous dispersion containing 15 to 55 per cent by weight of said copolymer, and the amount of said volatile liquid being not less than 25 per cent of the weight of said aqueous dispersion.

2. The process which comprises rapidly agitating an aqueous dispersion of a vinyl halide resin containing more than 50% by weight of vinyl halide with a water-immiscible, volatile, liquid swelling agent for said resin until a water-in-oil type of emulsion is obtained, said dispersion containing 15 to 55 per cent by weight of said resin the amount of said swelling agent being not less than 25% of the weight of said aqueous dispersion.

3. The process which comprises mixing an aqueous dispersion of a solid copolymer of vinyl chloride and another compound having the group $CH_2=C<$, containing more than 50 per cent by weight of vinyl chloride with a substantially water-immiscible, volatile, organic liquid in which said copolymer is substantially insoluble but which is capable of swelling said copolymer when contacted therewith at temperatures below 50° C., and subjecting the mixture to rapid agitation until a water-in-oil type of emulsion is obtained, said aqueous dispersion containing 15 to 55 per cent by weight of said copolymer, and the amount of said volatile liquid being not less than 25 per cent of the weight of said aqueous dispersion.

4. The process which comprises mixing an aqueous dispersion of a solid copolymer of vinyl chloride with 1 to 25 per cent by weight of a dialkyl fumarate with a substantially water-immiscible, volatile, organic liquid in which said copolymer is substantially insoluble but which is capable of swelling said copolymer when contacted therewith at temperatures below 50° C., and subjecting the mixture to rapid agitation until a water-in-oil type of emulsion is obtained, said aqueous dispersion containing 15 to 55 per cent by weight of said copolymer, and the amount of said volatile liquid being not less than 25 per cent of the weight of said aqueous dispersion.

5. The process which comprises mixing an aqueous dispersion of polyvinyl chloride with a substantially water-immiscible, volatile, organic liquid in which said polyvinyl chloride is substantially insoluble but which is capable of swelling said copolymer when contacted therewith at temperatures below 50° C., and subjecting the mixture to rapid agitation until a water-in-oil type of emulsion is obtained, said aqueous dispersion containing 30 to 50 per cent by weight of said copolymer, and the amount of said volatile liquid being not less than 50 per cent of the weight of said aqueous dispersion.

6. The process according to claim 1 in which a plasticizer for said copolymer is mixed with the ingredients of said emulsion.

7. The process according to claim 3 in which a plasticizer for said copolymer is mixed with the ingredients of said emulsion.

8. The process according to claim 4 in which a plasticizer for said copolymer and a pigment are mixed with said volatile, organic liquid, and then said aqueous dispersion of the copolymer is stirred into the mixture, the total weight of said plasticizer and pigment being up to 50 per cent by weight of the resulting water-in-oil type emulsion.

9. The process which comprises polymerizing an aqueous emulsion of vonyl chloride containing 5 to 25 per cent by weight of a dialkyl ester of a dicarboxylic acid having the formula HOOC—CR=CR'—COOH where R and R' represent hydrogen and alkyl radicals to obtain an aqueous dispersion of the resulting copolymer, and rapidly stirring said dispersion into a volatile, water-immiscible liquid which is a swelling agent for said copolymer at temperatures below 50° C. until a water-in-oil type of emulsion is obtained, said dispersion containing 15 to 50 per cent by weight of said copolymer, and the amount of said volatile liquid being not less than 25 per cent of the weight of said dispersion.

10. The process which comprises polymerizing an aqueous emulsion of vinyl chloride containing 5 to 25 per cent by weight of a dialkyl fumarate to obtain an aqueous dispersion of the resulting copolymer, and rapidly stirring said dispersion into a volatile, water-immiscible liquid which is a swelling agent for said copolymer at temperatures below 50° C. until a water-in-oil type of emulsion is obtained, said dispersion containing 30 to 50 per cent by weight of said copolymer, and the amount of said volatile liquid being not less than 50 per cent of the weight of said dispersion.

11. The process which comprises polymerizing an aqueous emulsion of vinyl chloride containing 5 to 25 per cent by weight of diethyl fumarate to obtain an aqueous dispersion of the resulting copolymer, and rapidly stirring said dispersion into a volatile, water-immiscible liquid which is a swelling agent for said copolymer at temperatures below 50° C. until a water-in-oil type of emulsion is obtained, said dispersion containing 30 to 50 per cent by weight of said copolymer, and the amount of said volatile liquid being not less than 50 per cent of the weight of said dispersion.

12. The process which comprises polymerizing an aqueous emulsion of vinyl chloride containing 5 to 25 per cent by weight of dimethyl fumarate to obtain an aqueous dispersion of the resulting copolymer, and rapidly stirring said dispersion into a volatile, water-immiscible liquid which is a swelling agent for said copolymer at temperatures below 50° C. until a water-in-oil type of emulsion is obtained, said dispersion containing 30 to 50 per cent by weight of said copolymer, and the amount of said volatile liquid being not less than 50 per cent of the weight of said dispersion.

13. A composition of matter comprising a water-in-oil type of emulsion containing a finely divided, solid vinyl halide resin containing more than 50% by weight of vinyl halide, a continuous phase comprising a volatile, water-immiscible liquid capable of swelling said resin at temperatures below 50° C. and water dispersed in said liquid, the amount of said resin being equal to 15 to 55 per cent of the sum of the weight of said resin and the water, and the amount of said liquid being equal to at least 25 per cent of said sum, said composition having a consistency from a heavy paste to a light, creamy liquid.

14. A composition of matter comprising a water-in-oil type of emulsion containing a finely divided, solid copolymer of vinyl chloride and another polymerizable acyclic unsaturated compound having one ethylenic bond containing more than 50 per cent by weight of vinyl chloride, a continuous phase comprising a volatile, water-immiscible liquid capable of swelling said copolymer at temperatures below 50° C. and water dispersed in said liquid, the amount of said resin being equal to 15 to 55 per cent of the sum of the weights of said resin and the water, and the amount of said liquid being equal to at least 25 per cent of said sum, said composition having a consistency from a heavy paste to a light, creamy liquid.

15. A composition of matter comprising a water-in-oil type of emulsion containing a finely divided, solid copolymer of vinyl chloride and a dialkyl fumarate containing 75 to 99 per cent by weight of vinyl chloride, a continuous phase comprising a volatile, water-immiscible liquid capable of swelling said copolymer at temperatures below 50° C. and water dispersed in said liquid, the amount of said copolymer being equal to 30 to 50 per cent of the sum of the weight of said copolymer and the water, and the amount of said liquid being equal to at least 50 per cent of said sum, said composition also containing at least one plasticizer for said copolymer and at least one pigment, the combined amount of plasticizer and pigment materials being not more than 50 per cent by weight of the composition, said composition having a creamy to pasty consistency.

16. The process which comprises heating the composition of claim 13 to a temperature sufficiently high to cause gelation thereof.

17. The process which comprises heating the composition of claim 14 to a temperature not lower than 90° C.

18. The process which comprises heating the composition of claim 15 to a temperature of about 100 to 160° C.

THURMAN V. WILLIAMS, Jr.

REFERENCES CITED

The following references are of record in the file of this patent:

FOREIGN PATENTS

| Number | Country | Date |
|--------|---------|------|
| 494,722 | Great Britain | Nov. 1, 1938 |

Certificate of Correction

Patent No. 2,467,352.  April 12, 1949.

THURMAN V. WILLIAMS, Jr.

It is hereby certified that errors appear in the printed specification of the above numbered patent requiring correction as follows:

Column 7, line 30, for "vonyl" read *vinyl*; column 8, line 73, list of references cited, for "494,722" read *494,772*;

and that the said Letters Patent should be read with these corrections therein that the same may conform to the record of the case in the Patent Office.

Signed and sealed this 20th day of September, A. D. 1949.

[SEAL]

JOE E. DANIELS,
*Assistant Commissioner of Patents.*